(12) United States Patent
Kinnee

(10) Patent No.: US 10,647,340 B2
(45) Date of Patent: May 12, 2020

(54) MOBILE STORAGE DEVICE

(71) Applicant: ZUCA, INC., Milpitas, CA (US)

(72) Inventor: Bruce E. Kinnee, Pleasanton, CA (US)

(73) Assignee: Zuca, Inc., Milpitas, CA (US)

(*) Notice: Subject to any disclaimer, the term of this patent is extended or adjusted under 35 U.S.C. 154(b) by 0 days.

(21) Appl. No.: 15/251,396

(22) Filed: Aug. 30, 2016

(65) Prior Publication Data

US 2018/0057031 A1 Mar. 1, 2018

(51) Int. Cl.
| | | |
|---|---|---|
| *B62B 1/04* | (2006.01) | |
| *B62B 1/12* | (2006.01) | |
| *B62B 5/00* | (2006.01) | |
| *B62B 5/08* | (2006.01) | |
| *B62K 27/00* | (2006.01) | |
| *B62B 5/06* | (2006.01) | |

(52) U.S. Cl.
CPC ............. *B62B 1/04* (2013.01); *B62B 1/12* (2013.01); *B62B 5/0079* (2013.01); *B62B 5/067* (2013.01); *B62B 5/085* (2013.01); *B62K 27/003* (2013.01)

(58) Field of Classification Search
CPC .... B62B 1/04; B62B 1/00; B62B 1/10; B62B 1/12; B62B 5/067
See application file for complete search history.

(56) References Cited

U.S. PATENT DOCUMENTS

| | | |
|---|---|---|
| 1,155,475 A | 10/1915 | Fay |
| D131,210 S | 1/1942 | Moreing |
| 2,277,302 A | 3/1942 | Chenette |
| 2,374,278 A | 4/1945 | Fuerstenberg |
| 2,439,992 A | 4/1948 | Simonian |
| D152,576 S | 2/1949 | Wallace |
| 2,472,491 A | 6/1949 | Quinton |
| 2,710,084 A | 6/1955 | Braverman |
| 2,758,847 A * | 8/1956 | Shone ............... B62B 7/10 280/648 |
| 2,759,738 A | 8/1956 | Reiter |
| 2,778,654 A * | 1/1957 | Gottlieb ............. A01G 20/30 280/47.24 |
| D180,868 S | 8/1957 | Diehl |

(Continued)

FOREIGN PATENT DOCUMENTS

| | | |
|---|---|---|
| CA | 2484901 A1 | 12/2003 |
| DE | 4221215 A1 | 6/1992 |

(Continued)

OTHER PUBLICATIONS

International Search Report and Written Opinion from PCT/US17/49018.

*Primary Examiner* — Brian L Swenson
(74) *Attorney, Agent, or Firm* — Haverstock & Owens LLP

(57) ABSTRACT

A mobile storage device comprises an exterior frame and an interior storage area within the exterior frame. The exterior frame comprises a seat for sitting on when the mobile storage device is not being rolled or moved. In some embodiments, the seat is movable from a closed position to an open position to access the interior storage frame. A flexible storage bag comprising one or more pockets is able be configured to fit within the interior storage area. In some embodiments, the exterior frame is adjustable to adjust a size of the interior storage area. In some embodiments, the exterior frame is collapsible for storing the mobile storage device.

21 Claims, 12 Drawing Sheets

(56) References Cited

U.S. PATENT DOCUMENTS

| | | |
|---|---|---|
| 2,835,503 A | 5/1958 | Humphries et al. |
| 2,842,373 A | 7/1958 | Duerr |
| 2,874,813 A | 2/1959 | Bunte |
| 2,905,480 A | 9/1959 | Giovannelli |
| 2,919,169 A * | 12/1959 | Jackson .................. A01K 97/22 220/553 |
| 2,957,700 A | 10/1960 | Beaurline |
| 3,092,395 A * | 6/1963 | Mitty ........................ B62B 1/12 280/14 |
| 3,420,540 A | 1/1969 | Bird |
| 3,460,850 A | 8/1969 | Frankline |
| D222,933 S | 2/1972 | Brown |
| 3,669,463 A | 6/1972 | Boudreau |
| 3,677,571 A | 7/1972 | Maturo, Jr. et al. |
| 3,684,307 A | 8/1972 | Bourgraf et al. |
| 3,759,538 A | 9/1973 | Fabiano |
| 3,782,752 A | 1/1974 | Gobetz |
| 3,829,113 A | 8/1974 | Epelbaum |
| 3,994,372 A | 11/1976 | Geller et al. |
| 3,997,213 A | 12/1976 | Smith et al. |
| 4,017,092 A | 4/1977 | Boomer |
| D252,264 S | 7/1979 | Paterson |
| 4,165,088 A | 8/1979 | Nelsonf |
| 4,247,130 A | 1/1981 | Paterson |
| 4,290,625 A | 9/1981 | Barriere |
| 4,350,366 A | 9/1982 | Helms |
| 4,355,818 A | 10/1982 | Watts |
| 4,460,188 A | 7/1984 | Maloof |
| 4,575,109 A | 3/1986 | Bowdery |
| 4,795,186 A | 1/1989 | Tyus |
| 4,813,520 A | 3/1989 | Lin |
| 4,846,486 A | 7/1989 | Hobson |
| 4,886,286 A | 12/1989 | Whorton, III |
| 5,115,895 A | 5/1992 | Myers |
| 5,118,130 A | 6/1992 | Kalz |
| 5,120,072 A | 6/1992 | Laramie |
| 5,203,815 A | 1/1993 | Miller |
| 5,197,754 A | 3/1993 | Ward |
| D334,640 S | 4/1993 | Forish |
| 5,244,225 A | 9/1993 | Frycek |
| D341,238 S | 11/1993 | Sloan, III |
| 5,265,892 A | 11/1993 | Said |
| 5,269,157 A * | 12/1993 | Ciminelli ................ A45B 11/00 280/47.18 |
| 5,294,137 A | 3/1994 | Barber et al. |
| 5,295,565 A | 3/1994 | Latshow |
| 5,318,315 A | 6/1994 | White et al. |
| 5,364,112 A | 11/1994 | Jackson |
| 5,364,120 A | 11/1994 | Wallace |
| 5,374,073 A | 12/1994 | Hung-Hsin |
| D358,695 S | 5/1995 | Hudson et al. |
| 5,439,241 A | 8/1995 | Nelson |
| 5,445,301 A | 8/1995 | Biedenharn, Jr. |
| 5,445,398 A | 8/1995 | Pierce |
| 5,462,299 A | 10/1995 | Maddux |
| D374,773 S | 10/1996 | Domotor |
| D378,456 S * | 3/1997 | Speicher ........................ D34/24 |
| 5,630,488 A | 5/1997 | Chen |
| 5,660,296 A | 8/1997 | Greenwich |
| 5,743,447 A * | 4/1998 | McDermott ......... A45C 7/0068 224/153 |
| 5,762,170 A | 6/1998 | Shyr et al. |
| 5,819,891 A * | 10/1998 | Wang .................. A45C 13/262 16/429 |
| 5,833,250 A | 11/1998 | Schier et al. |
| 5,836,601 A | 11/1998 | Nelson |
| 5,863,055 A | 1/1999 | Kasravi et al. |
| 5,887,878 A | 3/1999 | Tisbo et al. |
| D410,784 S | 6/1999 | Sanford et al. |
| 5,967,544 A | 10/1999 | Kanta |
| 5,988,657 A | 11/1999 | Henkel |
| 6,000,509 A | 12/1999 | Chisholm |
| 6,024,194 A | 2/2000 | Chung-Hsien |
| 6,059,079 A | 5/2000 | Krulik |
| 6,086,073 A | 7/2000 | Tisbo |
| 6,196,560 B1 | 3/2001 | Ohisson |
| 6,220,610 B1 | 4/2001 | Cox |
| 6,267,393 B1 * | 7/2001 | Mengrone ................ A45C 5/14 280/30 |
| 6,328,329 B1 | 12/2001 | Smith |
| 6,345,830 B1 | 2/2002 | Chavez |
| 6,357,567 B1 | 3/2002 | Tsai |
| 6,362,736 B1 | 3/2002 | Gehlot |
| D456,973 S | 5/2002 | Kimpel |
| 6,382,736 B1 | 5/2002 | Chang |
| 6,386,557 B1 | 5/2002 | Weldon |
| 6,454,065 B1 | 9/2002 | Chen |
| 6,471,237 B1 | 10/2002 | Bedsole |
| 6,510,380 B1 | 1/2003 | Curalolo et al. |
| 6,520,514 B2 | 2/2003 | Clegg |
| 6,543,800 B1 | 4/2003 | Doran |
| 6,550,860 B2 | 4/2003 | Lombardi |
| 6,598,898 B2 | 7/2003 | Chu |
| 6,666,465 B2 | 12/2003 | Chan |
| 6,724,306 B1 | 4/2004 | Parsley, Jr. et al. |
| D489,507 S | 5/2004 | Hahn |
| 6,729,630 B2 | 5/2004 | Szmidt et al. |
| 6,769,701 B1 | 8/2004 | Clausen |
| 6,783,135 B1 | 8/2004 | Nord |
| 6,805,225 B2 | 10/2004 | Freedom |
| 6,814,361 B2 | 11/2004 | Tsu |
| 6,880,851 B1 | 4/2005 | Summers et al. |
| 6,929,275 B1 | 8/2005 | Schlangen |
| 6,955,365 B2 | 10/2005 | Giampavolo et al. |
| 6,964,420 B1 | 11/2005 | Ghanizadeh et al. |
| 7,015,814 B2 | 3/2006 | Ireland et al. |
| 7,040,635 B1 | 5/2006 | Romole |
| 7,066,311 B2 | 6/2006 | O'Shea |
| 7,151,454 B2 | 12/2006 | Washington |
| 7,165,661 B2 | 1/2007 | Miyoshi |
| 7,168,713 B2 | 1/2007 | Udall et al. |
| 7,196,621 B2 | 3/2007 | Kochis |
| 7,207,577 B2 | 4/2007 | Udall et al. |
| 7,219,902 B1 | 5/2007 | Herold |
| 7,281,731 B2 * | 10/2007 | Shamah ..................... B62B 1/12 280/639 |
| D554,860 S | 11/2007 | Udall |
| D554,861 S | 11/2007 | Udall |
| 7,334,669 B2 * | 2/2008 | Barker ................. A45C 7/0031 190/104 |
| 7,523,949 B1 | 4/2009 | Galfin |
| 7,798,499 B2 | 9/2010 | Gregory |
| 8,172,241 B2 | 5/2012 | Salvucci, Jr. |
| 8,191,908 B2 | 6/2012 | Udall et al. |
| D671,291 S * | 11/2012 | Spann ............................ D34/14 |
| 8,317,205 B2 | 11/2012 | Udall et al. |
| 8,641,056 B1 * | 2/2014 | Carter ........................ A45F 3/10 280/30 |
| 2002/0105156 A1 | 8/2002 | Gidden |
| 2002/0114539 A1 | 8/2002 | Strevey et al. |
| 2002/0195782 A1 | 12/2002 | Cates et al. |
| 2003/0011173 A1 * | 1/2003 | Shall ..................... A01K 97/22 280/651 |
| 2003/0015858 A1 | 1/2003 | Chu |
| 2003/0034636 A1 * | 2/2003 | Ng ............................ A45C 5/14 280/652 |
| 2003/0197340 A1 | 10/2003 | Udall et al. |
| 2004/0032102 A1 | 2/2004 | Safari et al. |
| 2005/0051981 A1 | 3/2005 | Wallace et al. |
| 2005/0098403 A1 | 5/2005 | McIntyre |
| 2005/0121275 A1 | 6/2005 | Platte, III |
| 2005/0268622 A1 * | 12/2005 | Krieger ................... F25B 21/04 62/3.6 |
| 2006/0087432 A1 | 4/2006 | Corbett, Jr. |
| 2007/0120336 A1 | 5/2007 | Udall et al. |
| 2007/0145700 A1 | 6/2007 | Ambrose et al. |
| 2007/0123596 A1 | 10/2007 | Gregory |
| 2008/0061523 A1 * | 3/2008 | Holand ................ A45C 13/385 280/47.24 |
| 2009/0145913 A1 * | 6/2009 | Panosian ................... B25H 3/02 220/666 |

(56) References Cited

U.S. PATENT DOCUMENTS

| | | | | |
|---|---|---|---|---|
| 2011/0006654 A1* | 1/2011 | Hassman | ............... | A47B 43/00 |
| | | | | 312/400 |
| 2016/0270496 A1* | 9/2016 | Pitchforth | ................ | A45C 7/00 |
| 2017/0121059 A1* | 5/2017 | Faris | ..................... | B65D 81/38 |

FOREIGN PATENT DOCUMENTS

| | | | |
|---|---|---|---|
| JP | 648482 | A | 2/1994 |
| JP | 3106863 | A | 2/1994 |
| JP | 1196920 | A | 7/1999 |
| JP | 2002177035 | A1 | 6/2002 |
| JP | 2004223093 | A | 8/2004 |
| JP | 3106076 | U | 10/2004 |
| JP | 3106076 | U | 11/2004 |
| JP | 2004344355 | A | 12/2004 |
| WO | 9846469 | A1 | 10/1998 |
| WO | 2004100699 | A1 | 11/2004 |
| WO | 2007149579 | A2 | 12/2007 |
| WO | 0194180 | A1 | 12/2011 |

\* cited by examiner

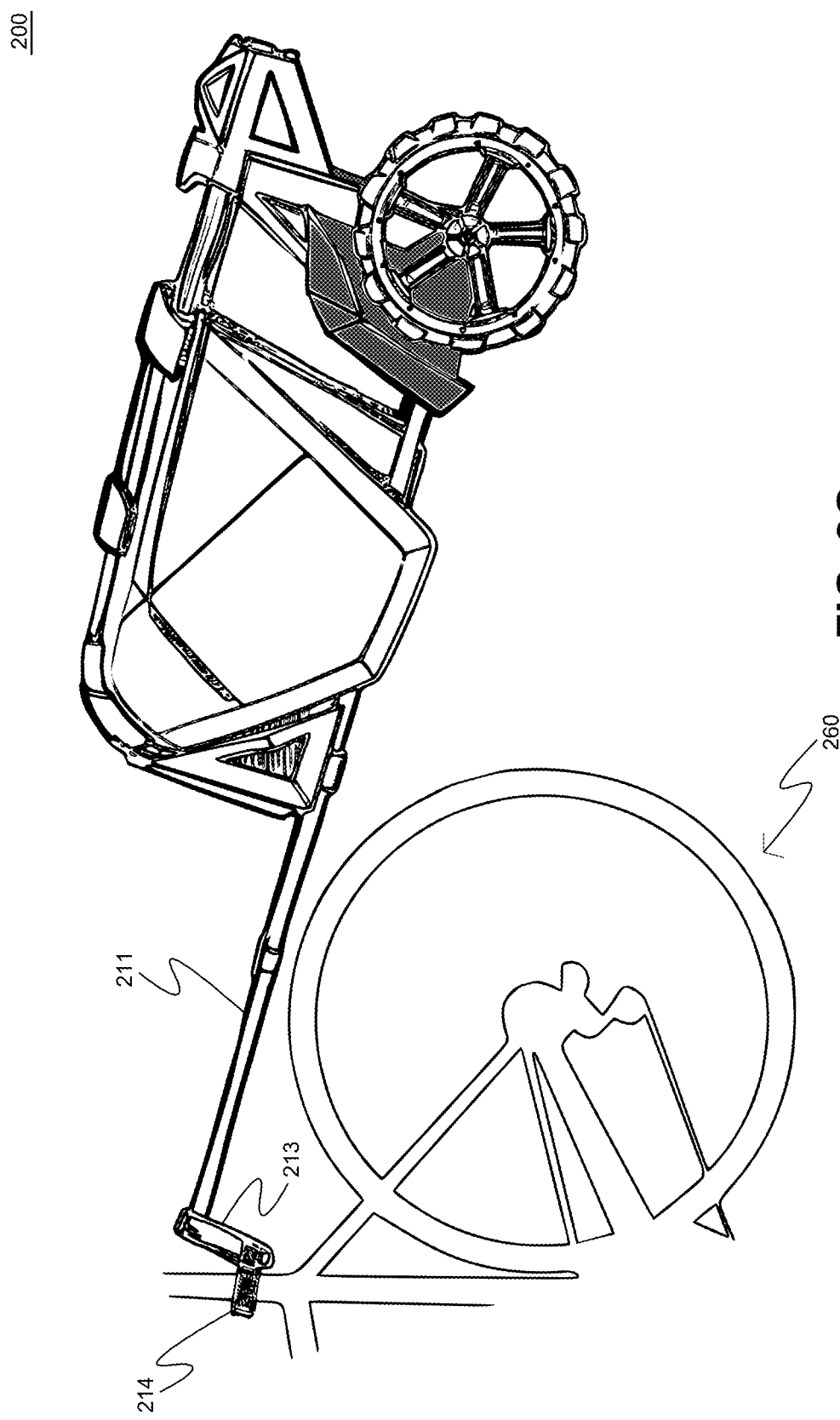

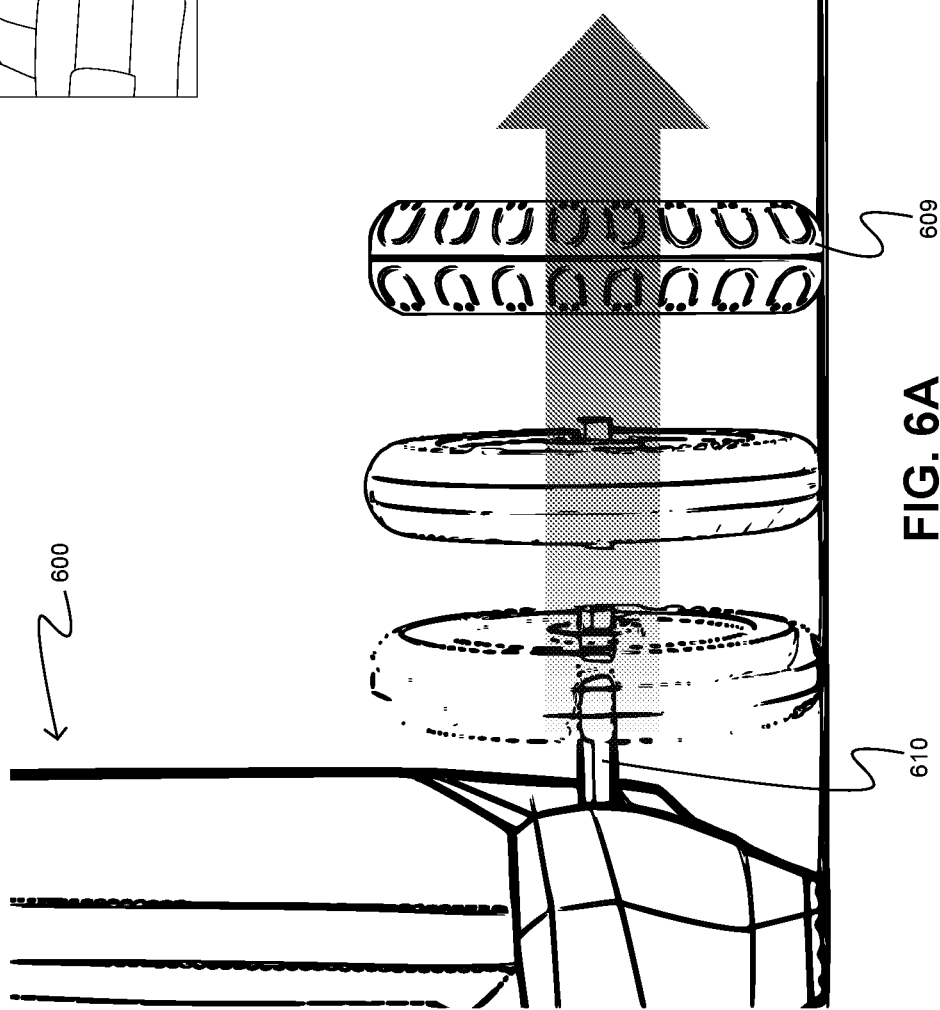
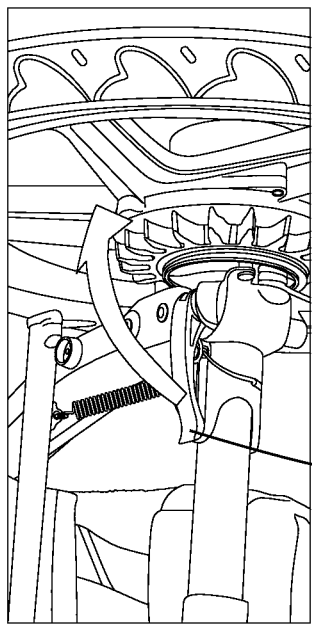
FIG. 6B
FIG. 6A

MOBILE STORAGE DEVICE

FIELD OF THE INVENTION

The present invention is generally directed to luggage and portable luggage and bags. More particularly, the present invention is directed to versatile mobile storage devices for outdoor use.

BACKGROUND OF THE INVENTION

Backpacks, duffel bags, luggage and other devices are often used as carriers to transport belongings and other materials. Such devices are often equipped with wheels to be rolled as the weight of belongings and materials increases and to save strain to a user's back and shoulders. However, such wheels may be inadequate for rolling the carrier over uneven services. Additionally, the carriers are often not adapted to specialized outdoor uses.

SUMMARY OF THE INVENTION

A mobile storage device comprises an exterior frame and an interior storage area within the exterior frame. The exterior frame comprises a seat for sitting on when the mobile storage device is not being rolled or moved. In some embodiments, the seat is movable from a closed position to an open position to access the interior storage frame. In some embodiments, a flexible storage bag comprising one or more pockets is configured to fit within the interior storage area. In some embodiments, the exterior frame is adjustable to adjust a size of the interior storage area. In some embodiments, the exterior frame is collapsible for storing the mobile storage device.

In one aspect, a mobile storage device comprises an exterior frame, a storage area within an interior of the frame, a seat on the top of the exterior frame, wherein the seat is rotatable between a closed position and an open position, wherein the storage area is accessible when the seat is in the open position, a plurality of wheels and a handle for rolling the storage device. In some embodiments, the mobile storage device comprises one or more handles for lifting the device. In some embodiments, the plurality of wheels are removable. In further embodiments, the exterior frame comprises a storage compartment coupled to a base of the exterior frame. In some embodiments, the mobile storage device comprises a flexible storage bag configured to fit within the storage area. In some embodiments, the storage area comprises one or more shelves.

In another aspect, a mobile storage device comprises an exterior frame, a storage area within the exterior frame, wherein the exterior frame is adjustable to adjust a size of the storage area, one or more wheels, and a handle for rolling the storage device. In some embodiments, the mobile storage device comprises a flexible storage bag configured to fit within the storage area. In some embodiments, the mobile storage device comprises a removable bag which fits in the flexible storage bag. In some embodiments, the removable bag comprises a waterproof material. In some of these embodiments, the flexible storage bag is adjustable to fit the size of the storage area. In some embodiments, the mobile storage device comprises a strap for coupling the storage device to a bicycle. In some embodiments, the mobile storage device comprises a telescoping handle. In further embodiments, the one or more wheels are removable. In further embodiments, the mobile storage device comprises a seat on the top of the exterior frame, wherein the seat is rotatable between a closed position and an open position, wherein the storage area is accessible when the seat is in the open position.

In a further aspect, a mobile storage device comprises an exterior frame comprising a left support, a right support, a bottom wall, a top wall, and a back wall, a storage area within the exterior frame, wherein one or more of the left support, the right support, the bottom wall, the top wall are foldable into the storage area to collapse the exterior frame, one or more wheels and a handle for rolling the storage device. In some embodiments, the one or more wheels are removable. In some embodiments, the mobile storage device comprises a flexible storage bag configured to fit within the storage area. In some of these embodiments, the flexible storage bag comprises a left pocket and a right pocket. In some embodiments, the top wall comprises a seat on the top of the exterior frame, wherein the seat is rotatable between a closed position and an open position, wherein the storage area is accessible when the seat is in the open position.

In still a further aspect, a mobile storage device comprises an exterior frame comprising a left support, a right support, a bottom wall, a top wall, and a back wall, a storage area within the exterior frame, a seat on the top of the exterior frame, wherein the seat is rotatable between a closed position and an open position, wherein the storage area is accessible when the seat is in the open position, one or more wheels, and a handle for rolling the storage device, wherein one or more of the left support, the right support, the bottom wall, the top wall are foldable into the storage area to collapse the exterior frame, and wherein the exterior frame is adjustable to adjust a size of the storage area.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures:

FIGS. 2A-2G illustrate a mobile storage device, in accordance with some embodiments.

FIGS. 6A and 6B illustrate a removable wheel for a mobile storage device, in accordance with some embodiments.

DETAILED DESCRIPTION OF THE EMBODIMENTS:

Embodiments of the invention are directed to a mobile storage device comprising an exterior frame and an interior storage area within the exterior frame. The exterior frame comprises a seat for sitting on when the mobile storage device is not being rolled or moved. In some embodiments, the seat is movable from a closed position to an open position to access the interior storage frame. A flexible storage bag comprising one or more pockets is configured to fit within the interior storage area. In some embodiments, the exterior frame is adjustable to adjust a size of the interior storage area. In some embodiments, the exterior frame is collapsible for storing the mobile storage device.

Reference will now be made in detail to implementation of a mobile storage device as illustrated in the accompanying drawings. The same reference indicators will be used throughout the drawings and the following detailed description to refer to the same or like parts. In the interest of clarity, not all of the routine features of the implementations described herein are shown and described. It will be appreciated that in the development of any such actual implementation, numerous implementation-specific decisions can be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1B:
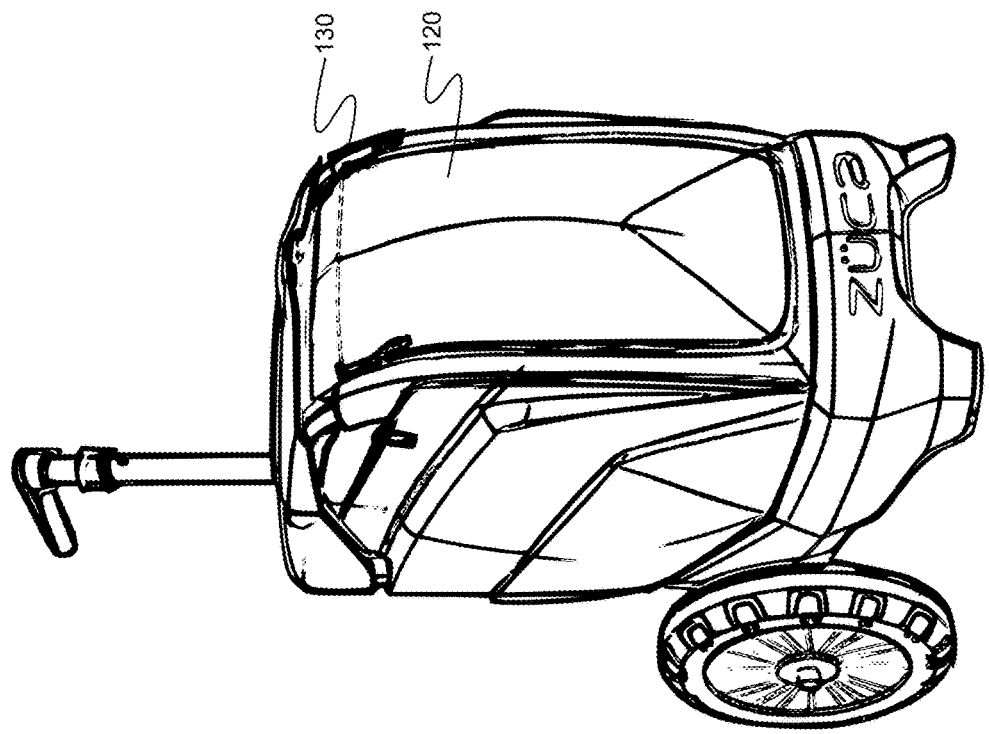
FIGS. 1A-1F illustrate a mobile storage device, in accordance with some embodiments.
Figure 1A:
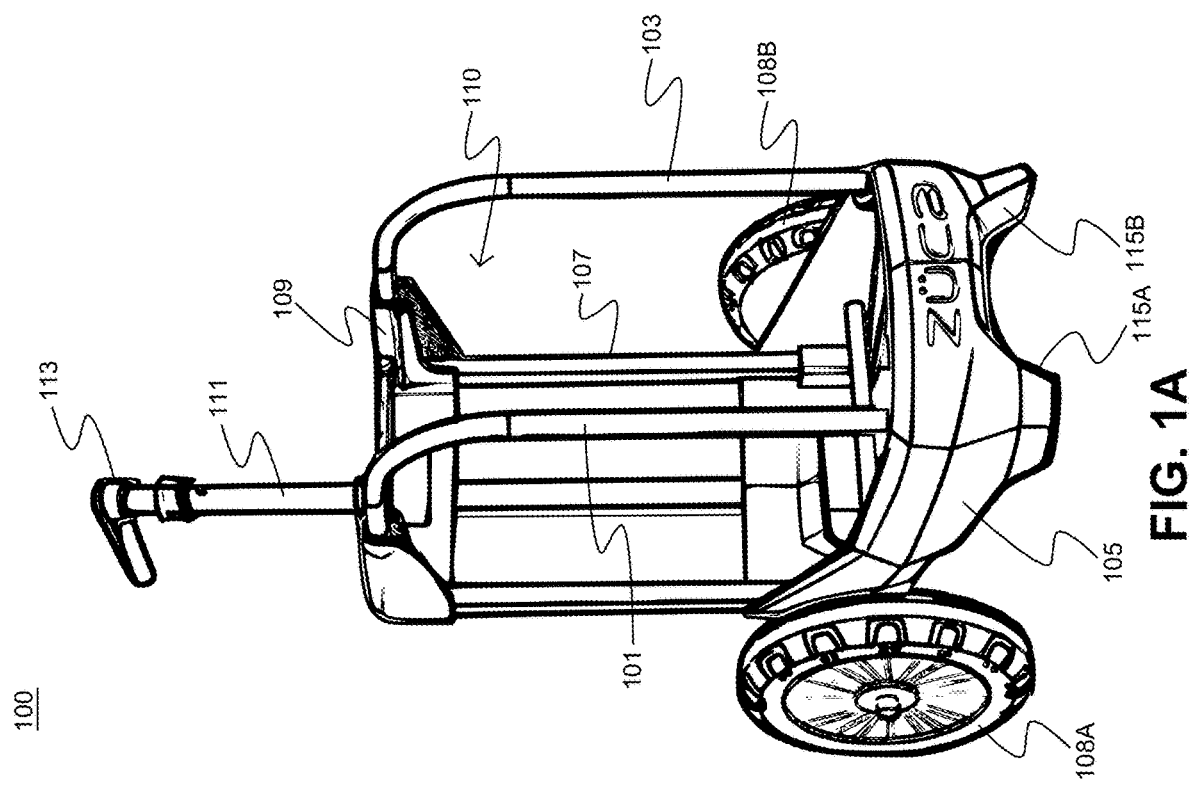

Referring now to FIG. 1A, a mobile storage device 100 is depicted therein. The mobile storage device 100 comprises an exterior frame 109, which encloses an interior space and/or storage area 110 of the storage device 100. As shown within FIG. 1A, in some embodiments, the frame 109 comprises a left support 101, a right support 103 and a base 105. The mobile storage device 100 also comprises one or more wheels 108A and 108B, and one or more supports 115A and 115B for balancing and supporting the device 100. In some embodiments, the storage device also comprises for lifting the device 100. The one or more handles 116 can be used lift the device 100, to for example, store the device 100 or when the one or more wheels 108A and 108B are not attached. A handle 113 can be used to roll the mobile device 100. In some embodiments, the handle 113 comprises a telescoping pole 111, which can be adjusted to a height as desired by the user. To roll the mobile device 100, the device 100 is tilted onto the wheels 108A and 108B, and pulled using the handle 113.

As shown within FIG. 1B, the mobile device 100 comprises a seat 130 which can be utilized by a user when the mobile device 100 is not being rolled. In some embodiments, the mobile device 100 comprises a flexible storage bag 120, which fits within the storage area 110 of the frame 109. The flexible storage bag 120 can comprise any appropriately desired number and configuration of pockets as desired and is appropriately sized to fit within the storage area 110. For example, in some embodiments, the flexible storage bag 120 comprises one or more exterior pockets on a side or a front of the storage bag 120.

In some embodiments, the frame 109 comprises aluminum. However, the frame 109 can be constructed from any appropriately desired material. In some embodiments, the base 105 and the seat 130 comprises an injection molded plastic or other material. In some embodiments, the one or more wheels 108A and 108B are detachable from the frame 109.

Figure 1C:
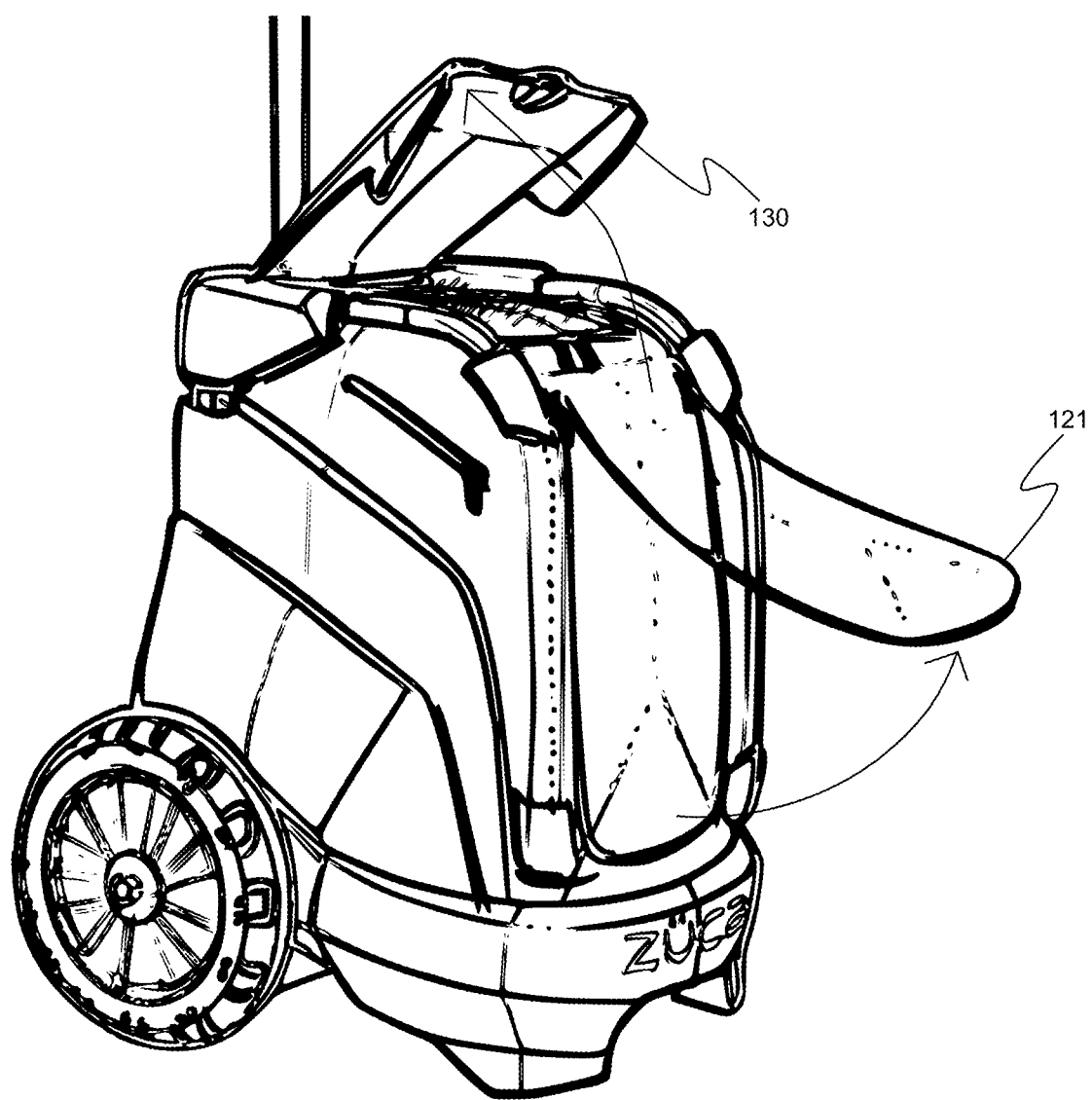

As shown within FIG. 1C, in some embodiments, the seat 130 is configured to flip up to allow access to a top of the storage area 110 and the flexible bag 120, when attached to the storage device 100. The seat 130 is rotatable between a closed position and an open position, and the storage area 110 is accessible when the seat 130 is in the open position.

Figure 1D:
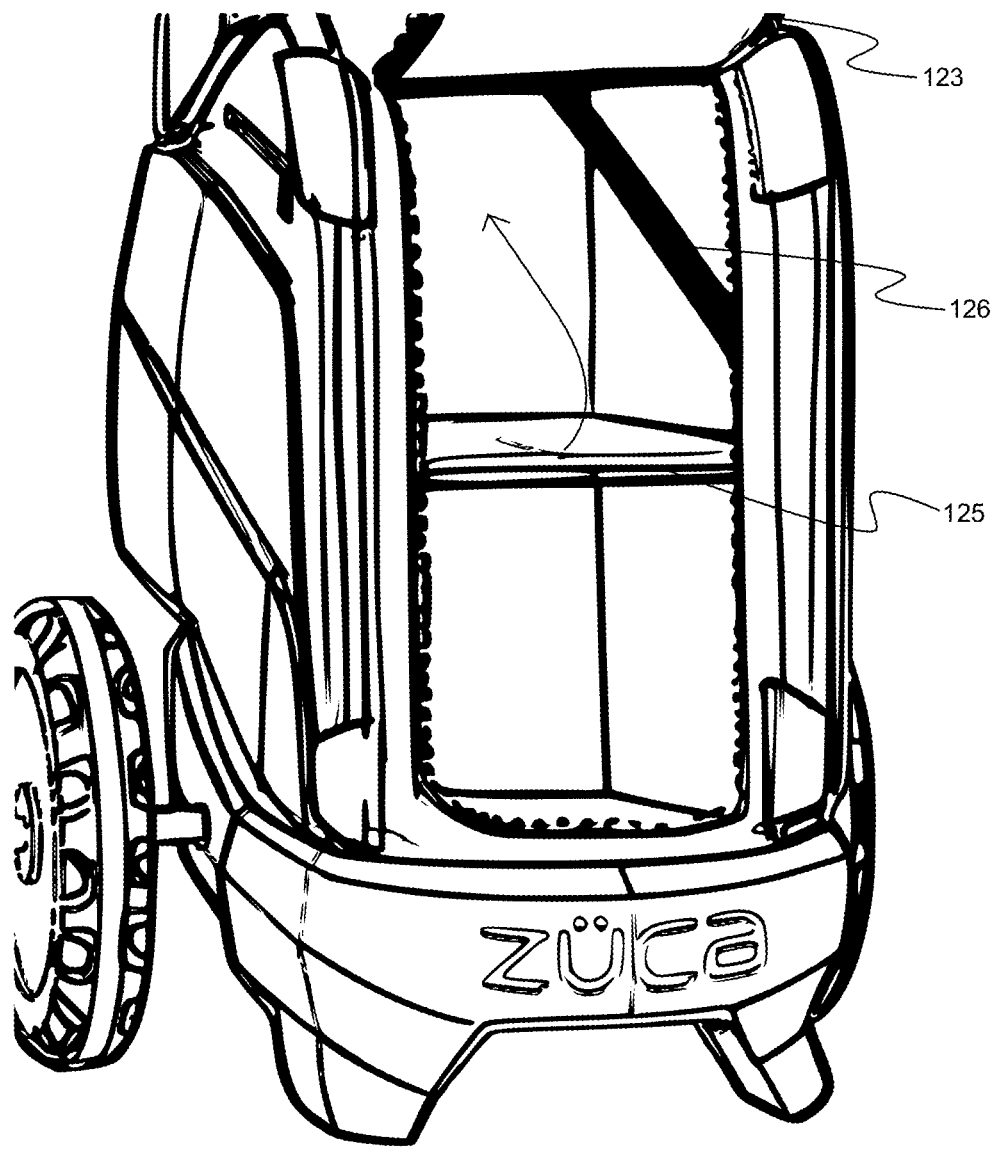

FIG. 1D shows an interior of the flexible storage bag 120 when coupled with the mobile storage device 100. As shown within FIG. 1D, in some embodiments, the storage bag 120 comprises a fold down shelf 125, which allows an interior compartment of the storage bag 120 to be divided into multiple compartments. A webbing strap 126 is built into the storage bag 120, to raise the shelf 125 for undivided storage. In some embodiments, a front panel 123 is opened to access an interior of the storage bag 120.

Figure 1F:
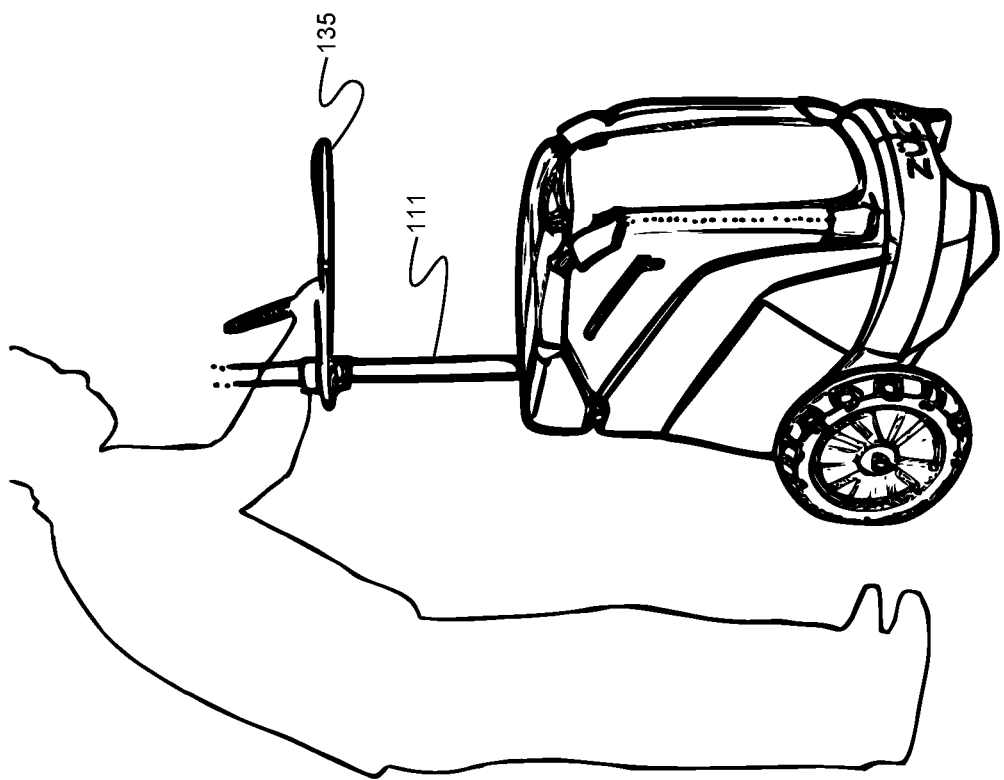
Figure 1E:
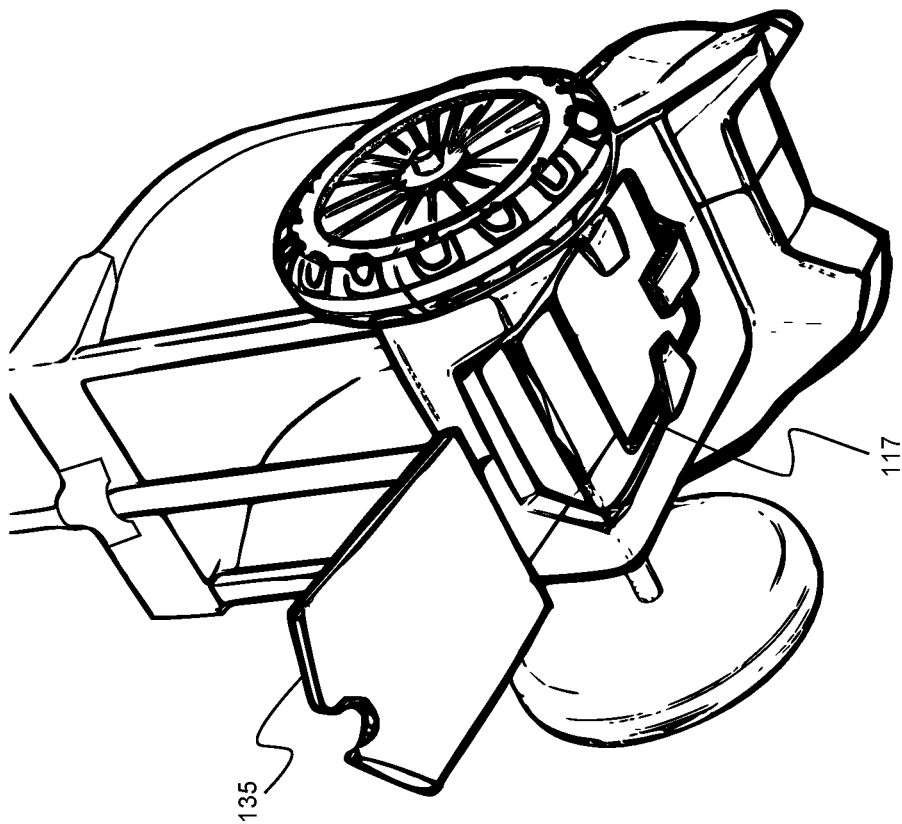

As shown within FIGS. 1E and 1F, in some embodiments, the mobile storage device 100 comprises a storage compartment 117 for storing an accessory such as a tray and/or a table 135. In some embodiments, the table 135 attaches to the telescoping pole 111. The table 135 can be used as a writing surface or surface for holding other objects.

Figure 2A:
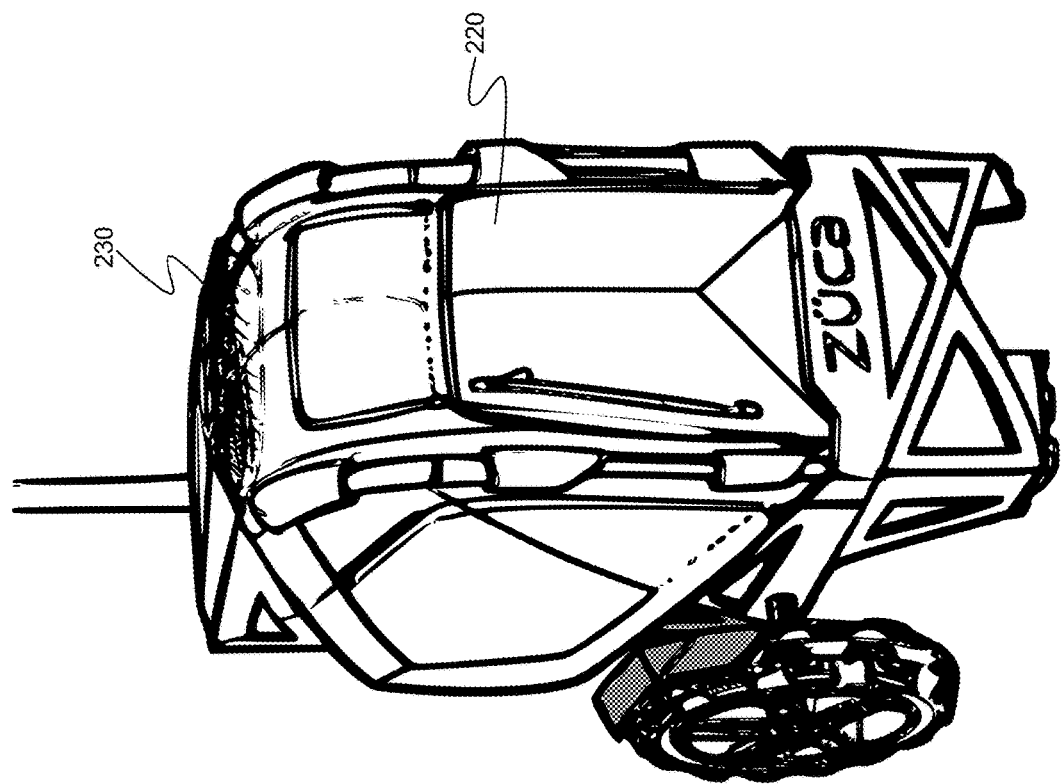

FIG. 2A illustrates a mobile storage device 200 in accordance with further embodiments. The mobile storage device 200 comprises an exterior frame 209, which encloses an interior space and/or storage area 210 of the interior frame 209. As shown within FIG. 2A, in some embodiments, the frame 209 comprises a left support 201, a right support 203 and a base 205. The mobile storage device 200 also comprises one or more wheels 208A and 208B, and one or more supports 215A and 215B for balancing and supporting the device 200. In some embodiments, the storage device also comprises one or more handles for lifting the device 200, such as described above. The one or more handles can be used lift the device 200, to for example, store the device 100 or when the one or more wheels 208A and 208B are not attached. A handle 213 can be used to roll the mobile device 200. In some embodiments, the handle 213 comprises a telescoping pole 211, which can be adjusted to a height as desired by the user. To roll the mobile device 200, the device 200 is tilted onto the wheels 208A and 208B, and pulled using the handle 213.

Figure 2B:
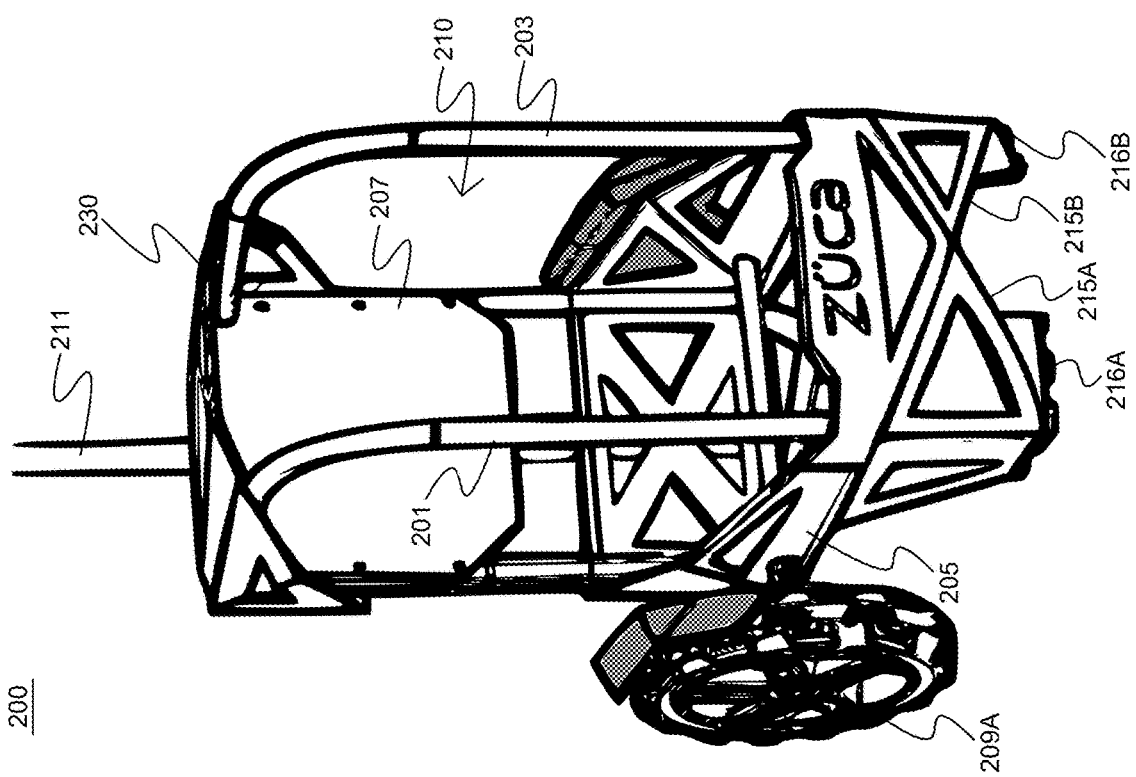
Figure 3D:
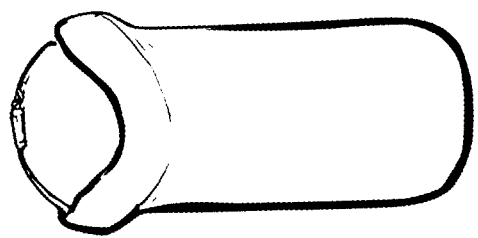
FIGS. 3A-3D illustrate a removable bag for a mobile storage device, in accordance with some embodiments.
Figure 3C:
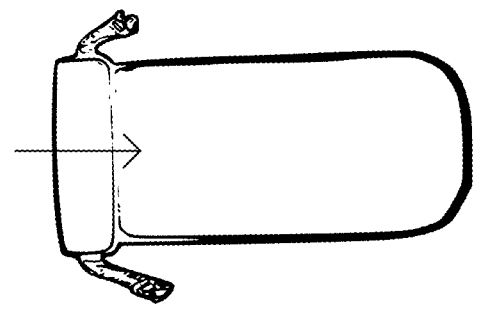
Figure 3B:
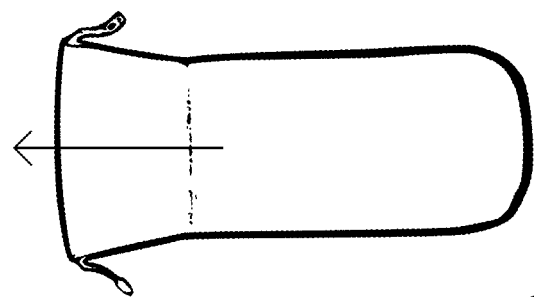
Figure 3A:
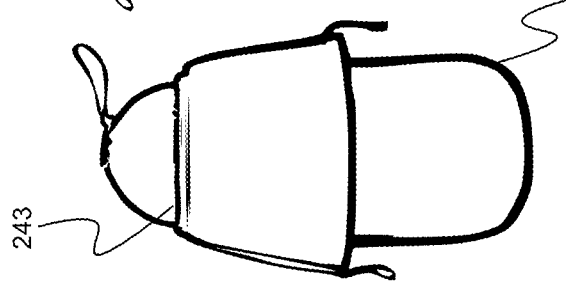

As shown within FIG. 2B, the mobile device 200 comprises a seat 230 which can be utilized by a user when the mobile device 200 is not being rolled. As described above in relation to the seat 130 above, the seat 230 is configured to flip up to allow access to a top of the storage area 210 and the flexible bag 220, when attached to the storage device 200. The seat 230 is rotatable between a closed position and an open position, wherein the storage area 210 is accessible when the seat 230 is in the open position. As further shown within FIG. 2B, in some embodiments, the mobile device 200 comprises a flexible storage bag 220, which fits within the storage area 210 of the frame 209. The flexible storage bag 220 can comprise any appropriately desired number and configuration of pockets as desired is appropriately sized to fit within the storage area 210. For example, in some embodiments, the flexible storage bag 202 comprises one or more exterior pockets on a side or a front of the storage bag 220.

In some embodiments, the mobile storage device 200 is configured for rolling over rugged terrain and comprises all terrain wheels. For example, in some embodiments, the frame 209 comprises steel, and the base 205 and the seat 230 comprises stamped metal. However, the frame 209 and the seat 230 can comprise any appropriately desired material designed to withstand rugged terrain. As described in relation to the wheels 208A and 208B, above, in some embodiments, the one or more wheels 208A and 208B are detachable from the frame 209. In some embodiments, the storage bag 220 comprises a waterproof material. For example, in some embodiments, the storage bag 220 comprises tarapaulin.

Figure 2C:
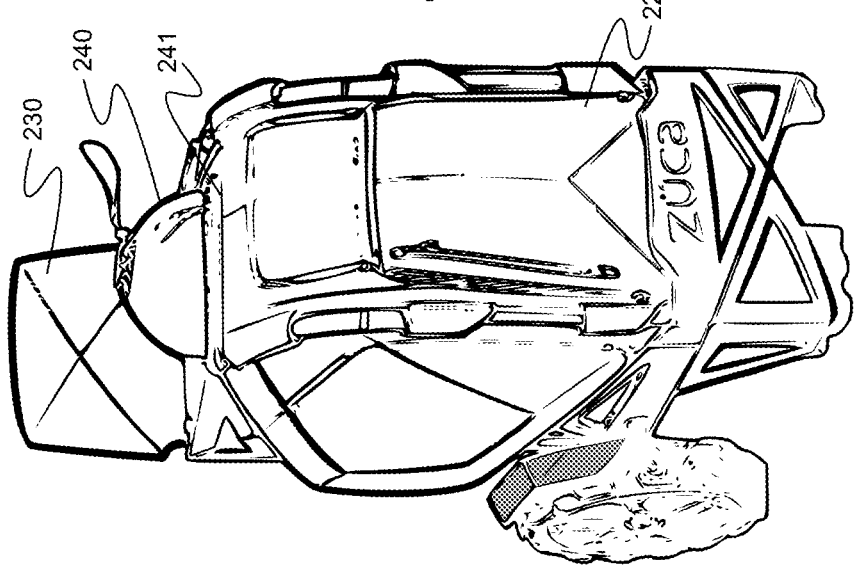

As shown within FIG. 2C, in some embodiments, the mobile storage device 200 comprises an auxiliary storage bag 240. In some embodiments, the auxiliary storage bag 240 zips into the mobile storage device 200. Particularly, a zipper 243 (FIGS. 3A-3D) of the storage bag 240 can zip together with the zipper 241 of the mobile storage device 200 to couple the auxiliary storage bag 240 with the mobile storage device 200. In some embodiments, the auxiliary storage bag 240 comprises a waterproof material such as tarapaulin and can be rolled in order to seal the contents from environmental intrusions.

In some embodiments, the mobile storage device 200 is adjustable to adjust a size of the storage area 210. For example, as shown within FIG. 2D, in some embodiments, the left support 201 and the right support 203 are extendable as indicated by the arrow to adjust the size of the storage area 210. Particularly, in some embodiments, the left support 201 and the right support 203 are extendable by a length of a left extension 202A and a right extension 202B to adjust a size of the storage area 210.

Figure 2F:
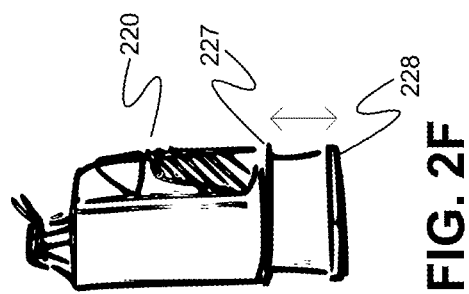
Figure 2D:
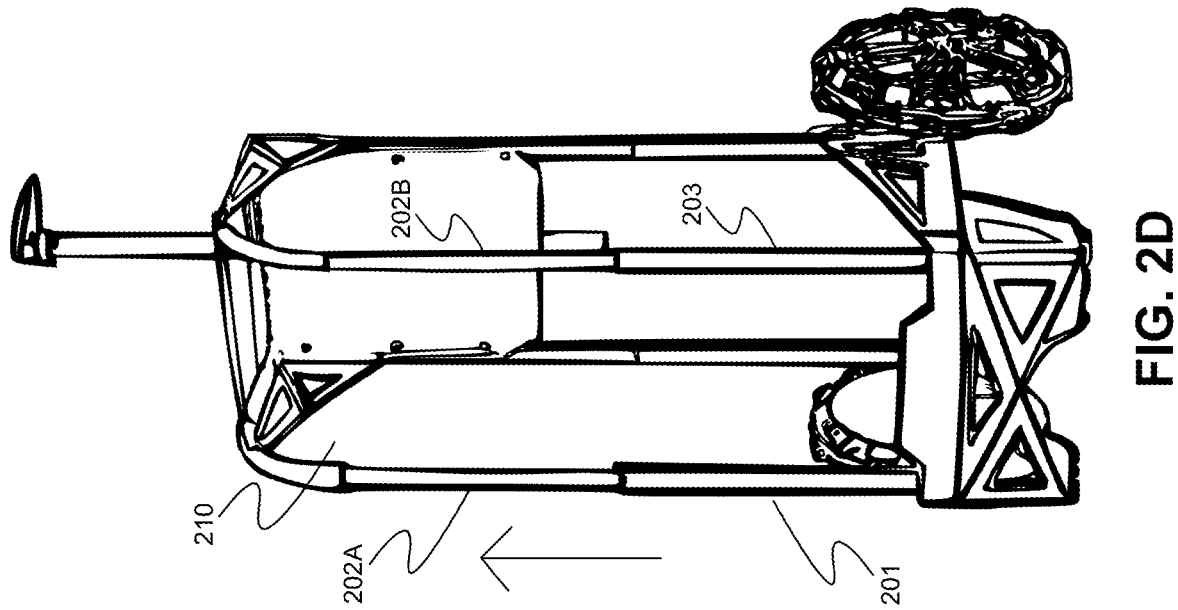
Figure 2E:
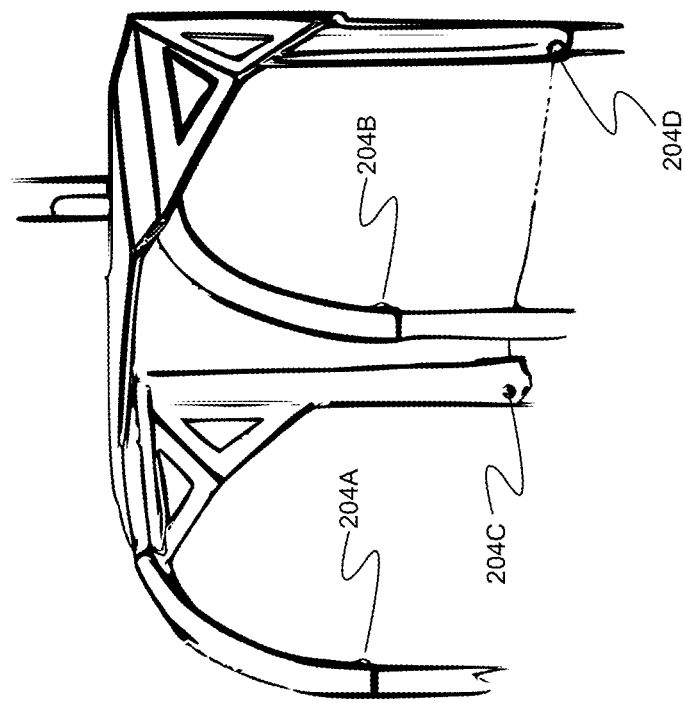

As shown within FIG. 2E, in some embodiments, the left support 201 and the right support 203 are adjusted by pushing one or more buttons 204A, 204B, 204C, and 204D inward to raise the left support 201 and the right support 203. In some embodiments, the size of the storage area 210 is adjustable to a plurality of different positions. As shown within FIG. 2F, in some embodiments, the flexible bag 220 is also adjustable to fit the size of the storage space 210. For example, in some embodiments, an auxiliary space 228 of the flexible bag 220 can be extended from a bottom of the flexible bag 220 by unzipping the zipper 227. However, the size of the flexible bag 220 can be adjusted by any appropriate method as known in the art.

In some embodiments, such as shown within FIGS. 2F and 2G, the mobile storage device is configured to be pulled by a bicycle. As shown within FIG. 2F, a strap 214 coupled to the handle 213 is configured to connect to a bicycle seat post to be pulled by the bicycle 260. The telescoping pole 211 is extended so that the device 200 clears the rear wheel of the bicycle and the strap 214 is connected to the bicycle seat post. In this position, the mobile storage device 200 is tilted onto the wheels and the mobile storage device can be pulled.

In further embodiments, a mobile storage device can comprise a collapsible design. FIG. 4A illustrates a mobile storage device 400 in accordance with further embodiments. The mobile storage device comprises an exterior frame 409, which encloses an interior space and/or storage area 410 of the interior frame 409. The frame 409 comprises a left support 401, a right support 403 and a base 405. The mobile storage device 400 also comprises one or more wheels 408A and 408B, and one or more handles 415A and 415B for lifting the device 400. The one or more handles 415A and 415B can be used lift the device 400, to for example, store the device 400 or when the one or more wheels 408A and 408B are not attached. A handle 413 can be used to roll the mobile device 400. In some embodiments, the handle 413 comprises a telescoping pole 411, which can be adjusted to a height as desired by the user. To roll the mobile device 400, the device 400 is tilted onto the wheels 408A and 408B, and pulled using the handle 413. In some embodiments, the handle 413 comprises a swivel handle.

Figure 4B:
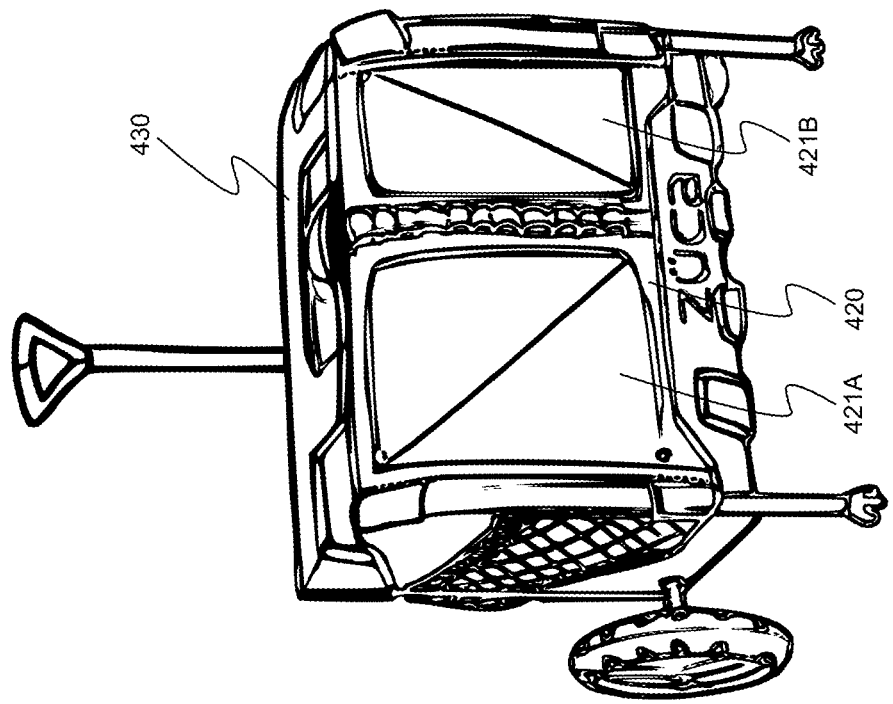
FIGS. 4A-4C illustrate a mobile storage device, in accordance with some embodiments.
Figure 4A:
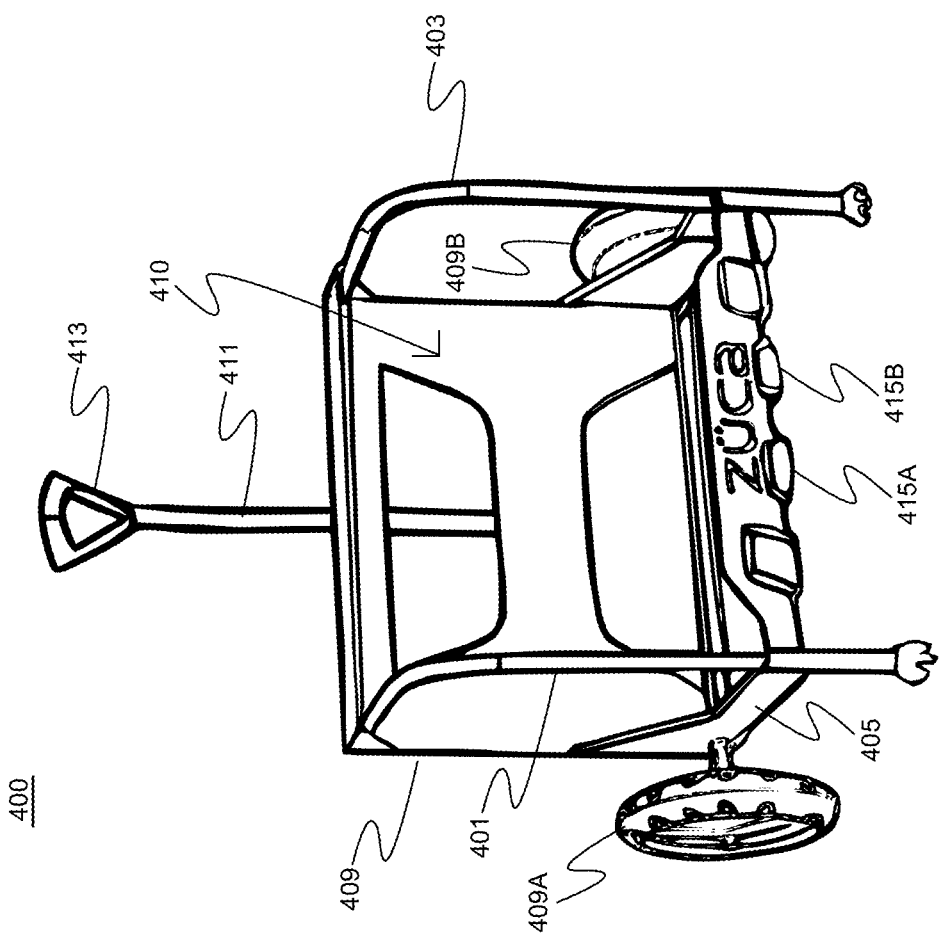

As shown within FIG. 4B, the mobile device 400 comprises a seat 430 which can be utilized by a user when the mobile device 400 is not being rolled. As described above in relation to the seat 130, the seat 430 is configured to flip up to allow access to a top of the storage area 410 and the flexible bag 420, when attached to the storage device 400. The seat 430 is rotatable between a closed position and an open position, wherein the storage area 410 is accessible when the seat 430 is in the open position. As further shown within FIG. 4B, in some embodiments, the mobile device 400 comprises a flexible storage bag 420, which fits within the storage area 410 of the frame 409. The flexible storage bag 420 can comprise any appropriately desired number and configuration of pockets as desired is appropriately sized to fit within the storage area 410. For example, in some embodiments, the flexible storage bag 404 comprises one or more exterior pockets on a side or a front of the storage bag 420.

Figure 4C:
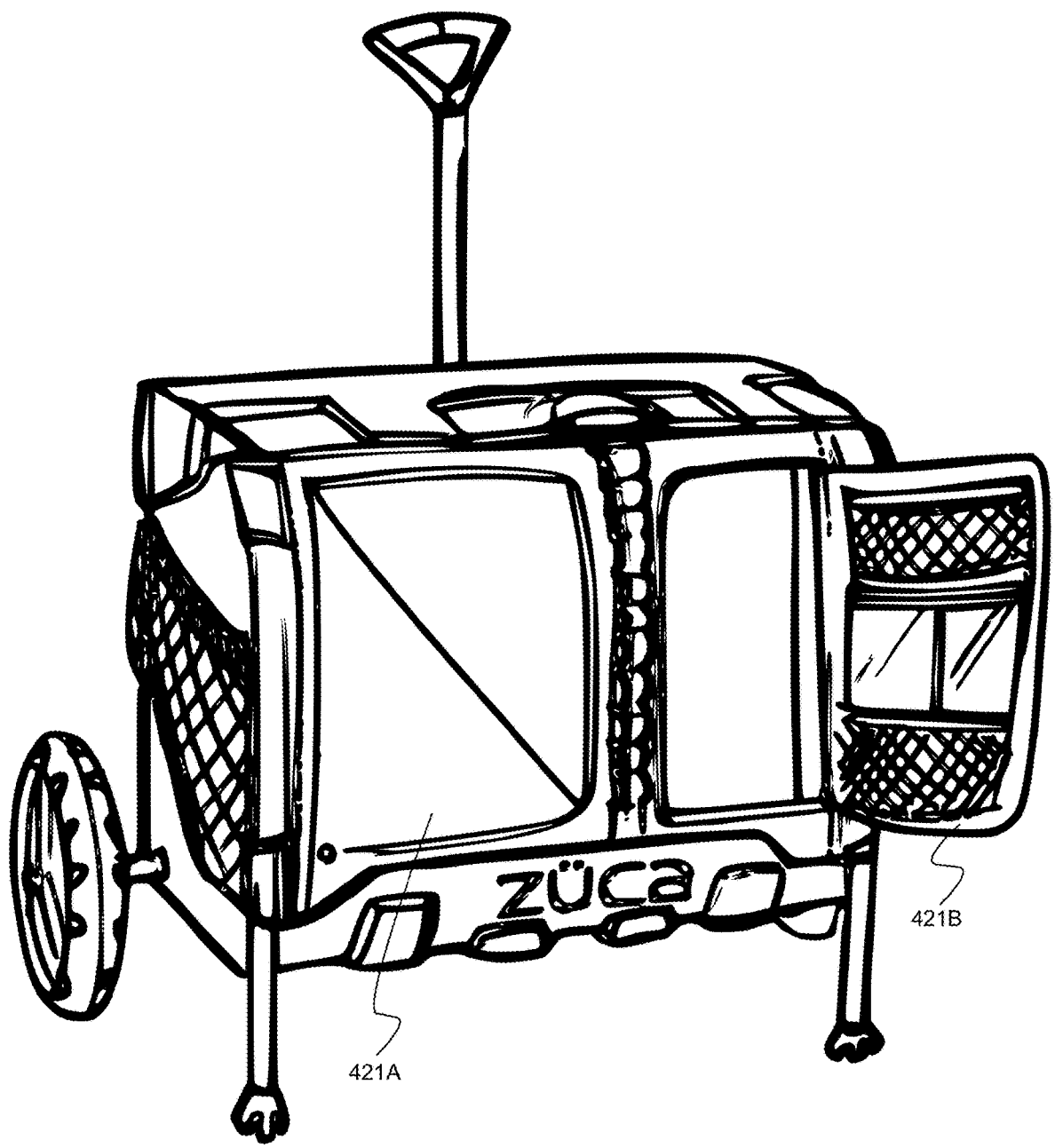

In some embodiments, the mobile storage device 400 is configured for rolling over rugged terrain and comprises all terrain wheels. For example, in some embodiments, the frame 409 comprises steel, and the base 405 and the seat 430 comprises stamped metal. However, the frame 409 and the seat 430 can comprise any appropriately desired material designed to withstand rugged terrain. As described in relation to the wheels 408A and 408B, above, in some embodiments, the one or more wheels 408A and 408B are detachable from the frame 409. In some embodiments, the storage bag 420 comprises a waterproof material. For example, in some embodiments, the storage bag 420 comprises tarapaulin. As shown within FIG. 4C, in some embodiments, the storage bag 420 comprises a plurality of outside pockets 421A and 421B. However, the storage bag 420 can comprise any number and configuration of pockets. For example, in some embodiments, an interior compartment of the storage bag 420 is divided into multiple compartments, such as described above.

In some embodiments, the frame 409 comprises steel, and the base 405 and the seat 430 comprises stamped metal. However, the frame 409 and the seat 430 can comprise any appropriately desired material designed to withstand rugged terrain. As described in relation to the wheels 408A and 408B, above, in some embodiments, the one or more wheels 408A and 408B are detachable from the frame 409. In some embodiments, the storage bag 420 comprises a waterproof material. For example, in some embodiments, the storage bag 420 comprises tarapaulin.

Figure 5A:
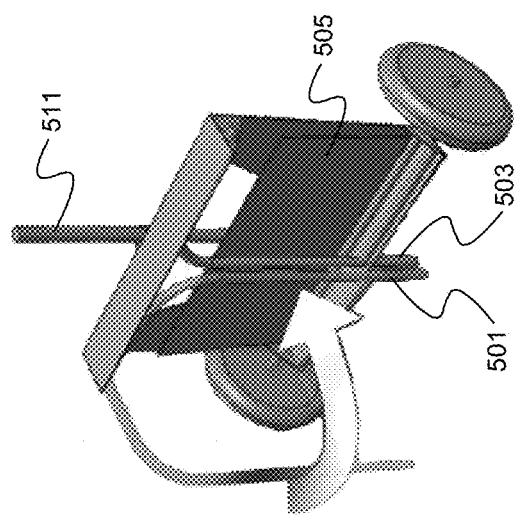
FIGS. 5A-5C illustrate a collapsible mobile storage, device in accordance with some embodiments.
Figure 5B:
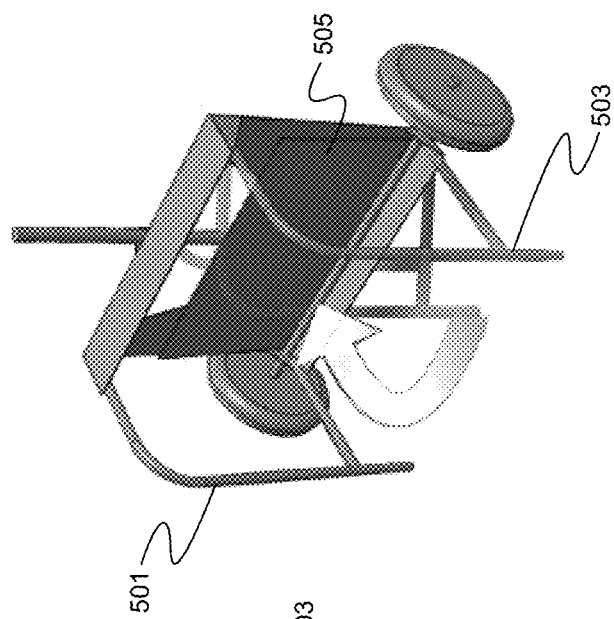
Figure 5C:
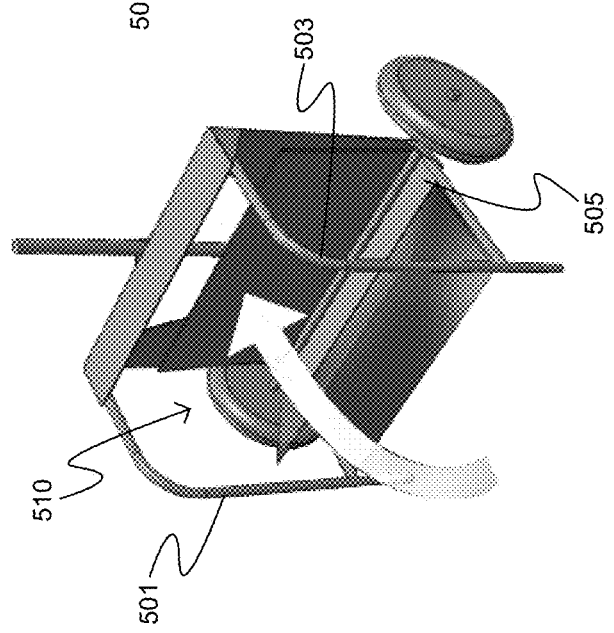

FIGS. 5A-5C illustrate an overview of the collapsible design of the mobile storage device 400, such as described above. As shown within FIG. 5A-5C, the base 505 or bottom wall, the left support 501 and the right support 503 are all folded into the storage area 510 and against a back wall of the storage device 500. As shown within FIG. 5C, with the mobile storage device can be stored for later use. In some embodiments, the telescoping pole 511 and the one or more wheels 509A and 509B are detached before the mobile storage device is stored.

FIG. 6A illustrates a quick detach wheel which can detach from a mobile storage device 100, 200 and 400, such as described above. As shown within the closeup view of FIG. 6B, in some embodiments, the wheel 609 comprises a quick release lever 612 which is moved to an unlock position so that the wheel 609 can be removed from an axle 610 of the storage device 600. However, as will be apparent to someone of ordinary skill in the art, the wheel 609 can be removed by any appropriately desired mechanism as known in the art.

In use, a mobile storage device, such as described above, has many applications. Particularly, the frame of the storage device is able to be manufactured from a variety of different materials and weights of materials configured for different tasks. Additionally, as described above, the wheels are able to be designed to roll over rough and smooth terrain including streets or other paths, such as when being pulled by a bicycle. Further the addition of a seat allows a user to use the mobile storage device in places where there is otherwise no seats. Specifically, the mobile storage device is able to be customized and designed for indoor and outdoor use and configured to carry a variety of different articles as desired. Consequently, the mobile storage device as described herein has many advantages.

The present invention has been described in terms of specific embodiments incorporating details to facilitate the understanding of the principles of construction and operation of the invention. Such references, herein, to specific embodiments and details thereof are not intended to limit the scope of the claims appended hereto. It will be apparent to those skilled in the art that modifications can be made in the embodiments chosen for illustration without departing from the spirit and scope of the invention.

What is claimed is:

1. A mobile storage device comprising:
   a. an exterior frame, wherein the exterior frame comprises a plurality of sections, wherein each of the plurality of sections are independently folded one at a time into an open storage area and against a back wall of the storage device for storing the mobile storage device;
   b. the storage area within an interior of the frame;
   c. a seat on the top of the exterior frame, wherein the seat is rotatable between a closed position and an open position, wherein the storage area is accessible when the seat is in the open position;
   d. a plurality of wheels; and
   e. a handle for rolling the storage device.

2. The mobile storage device of claim 1, further comprising one or more handles for lifting the device.

3. The mobile storage device of claim 1, wherein the plurality of wheels are removable.

4. The mobile storage device of claim 1, wherein the exterior frame comprises a storage compartment coupled to a base of the exterior frame.

5. The mobile storage device of claim 1, wherein the mobile storage device comprises a flexible storage bag configured to fit within the storage area.

6. The mobile storage device of claim 1, wherein the storage area comprises one or more shelves.

7. A mobile storage device comprising:
   a. an exterior frame, wherein the exterior frame comprises a plurality of sections, wherein each of the plurality of sections are independently folded one at a time into a storage area and against a back wall of the storage device for storing the mobile storage device;
   b. the storage area within the exterior frame, wherein the storage area is accessible from one of a left side, a right side, and front of the exterior frame; and
   c. one or more wheels; and
   d. a handle for rolling the storage device.

8. The mobile storage device of claim 7, comprising a flexible storage bag configured to fit within the storage area.

9. The mobile storage device of claim 8, comprising a removable bag which fits in the flexible storage bag.

10. The mobile storage device of claim 9, wherein the removable bag comprises a waterproof material.

11. The mobile storage device of claim 10, wherein the one or more wheels are removable.

12. The mobile storage device of claim 8, wherein the flexible storage bag is adjustable to fit the size of the storage area.

13. The mobile storage device of claim 7, comprising a strap for coupling the storage device to a bicycle.

14. The mobile storage device of claim 7, comprising a telescoping handle.

15. The mobile storage device of claim 7, comprising a seat on the top of the exterior frame, wherein the seat is rotatable between a closed position and an open position, wherein the storage area is accessible when the seat is in the open position.

16. A mobile storage device comprising:
   a. an exterior frame comprising a left support, a right support, a bottom wall, a top wall, and a back wall;
   b. a storage area within the exterior frame, wherein each of the left support, the right support, and the bottom wall, are independently folded one at a time into the storage area and against a back wall of the storage device to collapse the exterior frame;
   c. one or more wheels; and
   d. a handle for rolling the storage device.

17. The mobile storage device of claim 16, wherein the one or more wheels are removable.

18. The mobile storage device of claim 16, comprising a flexible storage bag configured to fit within the storage area.

19. The mobile storage device of claim 18, wherein the flexible storage bag comprises a left pocket and a right pocket.

20. The mobile storage device of claim 16, wherein the top wall comprises a seat on the top of the exterior frame, wherein the seat is rotatable between a closed position and an open position, wherein the storage area is accessible when the seat is in the open position.

21. A mobile storage device comprising:
   a. an exterior frame comprising a left support, a right support, a bottom wall, a top wall, and a back wall;
   b. a storage area within the exterior frame;
   c. a seat on the top of the exterior frame, wherein the seat is rotatable between a closed position and an open position, wherein the storage area is accessible when the seat is in the open position;
   c. one or more wheels; and
   d. a handle for rolling the storage device,
   wherein each of the left support, the right support, and the bottom wall are independently folded one at a time into the storage area and against a back wall of the storage device to collapse the exterior frame.

* * * * *